Figure 1:
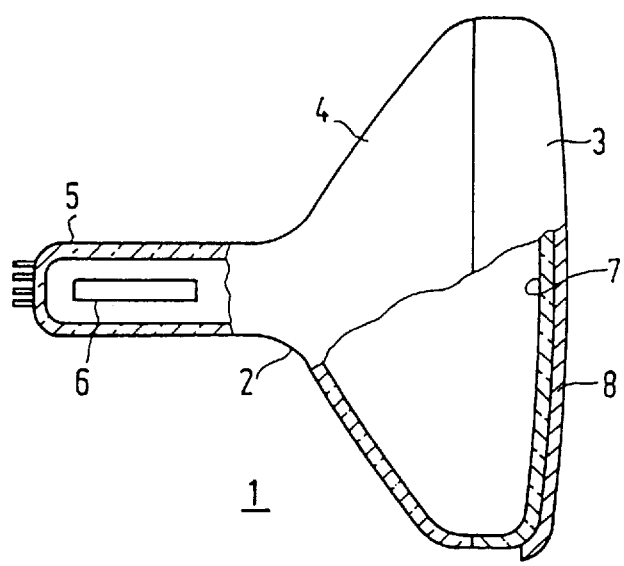

United States Patent [19]
Aben et al.

[11] Patent Number: 5,869,129
[45] Date of Patent: Feb. 9, 1999

[54] METHOD OF MANUFACTURING A COATING ON A DISPLAY SCREEN AND A DISPLAY DEVICE COMPRISING A DISPLAY SCREEN HAVING A COATING

[75] Inventors: Gerardus V. A. Aben; Jurgen P. A. Heymbeeck; Marcus J. Van Bommel; Angela C. L. Van De Poel, all of Eindhoven, Netherlands

[73] Assignee: U.S. Philips Corporation, New York, N.Y.

[21] Appl. No.: 706,630

[22] Filed: Sep. 6, 1996

Related U.S. Application Data

[63] Continuation of Ser. No. 324,568, Oct. 18, 1994, abandoned.

[30] Foreign Application Priority Data

Oct. 18, 1993 [BE] Belgium .................................. 9301103
Dec. 6, 1993 [BE] Belgium .................................. 9301338

[51] Int. Cl.[6] .................................................. B65D 165/06
[52] U.S. Cl. .............................. 427/64; 427/68; 427/108; 427/126.2; 427/126.3; 427/162; 427/165; 427/226; 427/380; 427/385.5; 427/389.7; 427/407.2; 427/419.2; 427/419.3
[58] Field of Search ................................ 427/64, 68, 226, 427/407.2, 419.2, 419.3, 165, 162, 108, 126.2, 389.7, 126.3, 380, 385.5

[56] References Cited

U.S. PATENT DOCUMENTS

| | | | |
|---|---|---|---|
| 4,775,412 | 10/1988 | Nishikura et al. | 75/5 A |
| 4,945,282 | 7/1990 | Kawamura | 427/64 |
| 5,002,799 | 3/1991 | Iwasaki | 427/64 |
| 5,219,611 | 6/1993 | Giannelis | 427/64 |
| 5,281,365 | 1/1994 | Sohn et al. | 427/64 |

OTHER PUBLICATIONS

H. Tohda et al, "Anti–Glare, Anti–Reflection and Anti–Static (AGRAS) Coating for CRTs", Japan Display, '92, pp. 289–292. (no mo.)

*Primary Examiner*—Janyce Bell
*Attorney, Agent, or Firm*—John C. Fox

[57] ABSTRACT

Method of manufacturing a coating on a display screen and a display device comprising a display screen having a coating.

The display screen 3 of a cathode ray tube 1 is provided with an antistatic coating 8 which comprises conductive, for example ATO ($Sb:SnO_2$) particles. The coating comprises at least one additional layer (10) of silicon dioxide to obtain an antireflective effect.

16 Claims, 2 Drawing Sheets

METHOD OF MANUFACTURING A COATING ON A DISPLAY SCREEN AND A DISPLAY DEVICE COMPRISING A DISPLAY SCREEN HAVING A COATING

This is a continuation of application Ser. No. 08/324,568, filed Oct. 18, 1994, now abandoned.

The invention relates to a method of manufacturing an antistatic coating which consists of more than one layer on a display screen and which comprises at least one antistatic layer.

The invention also relates to a display screen having an antistatic coating.

Antistatic coatings are used on display screens of display devices, in particular CRTs. Such coatings are sufficiently electroconductive to ensure that a high electrostatic voltage present on the outside surface of the display screen is removed within a few seconds. Thus, the user does not experience an unpleasant shock if he touches the screen. Besides, the attraction of atmospheric dust is reduced.

One of the layers of the coating is an antistatic layer comprising an electroconductive compound. Known coatings comprise, in addition to such antistatic layer, layers having, for example, an antireflective or antiglare effect or a layer which improves the scratch resistance. Usually these other layers are provided by spinning or spraying of a silica layer.

BACKGROUND OF THE INVENTION

A method of the type mentioned in the opening paragraph is known from "Japan Display '92, pp. 289–292: "Antiglare, Anti-reflection and antistatic (AGRAS) Coating for CRTs"", by H. Tohda et. al. In this document a method is described in which a display screen is provided with a conductive (antistatic) SnO layer by means of CVD (Chemical Vapour Deposition), whereafter a central and outermost $SiO_2$ layer are provided by, respectively, spinning, spraying and a thermal treatment.

This method is very laborious and time consuming; the CVD process is carried out in a separate reaction space. After the SnO layer is provided the surface is treated by means of polishing and cleaning.

SUMMARY OF THE INVENTION

It is an object of the invention to provide a simple method of manufacturing multilayer antistatic coatings.

In accordance with the invention, the object of providing a simple method of manufacturing a multilayer antistatic coating is achieved in that a layer of conductive particles is provided on the display screen, whereafter a second layer of a compound is provided and this compound penetrates into the first layer, after which the compound is converted into an additional second layer by subjecting it to a treatment at an increased temperature.

The penetrating compound causes the layer to be sealed and to adhere to the surface of the display screen. It is no longer necessary to subject the first layer to further treatments, such as polishing and cleaning, to obtain a satisfactory adhesion between the first and the second layer. By virtue thereof, a substantial simplification of the method is possible. Preferably the layer of conductive particles is a porous layer. Penetration of the compound into the first layer is thereby promoted.

It should preferably also be possible to carry out the method at relatively low temperatures. The use of relatively low temperatures generally reduces the process time and the risk of damage as a result of thermal stresses.

To this end, an embodiment of the method in accordance with the invention is characterized in that an aqueous suspension of particles of antimony-doped tin oxide is provided on the display screen and subsequently dried thereby forming the antistatic layer, whereafter, preferably a second layer of an alcoholic or aqueous alkoxy silane or titane compound is provided on the antistatic layer, after which said alkoxy silane compound is converted into silicon dioxide or titanium dioxide by subjecting it to a treatment at an increased temperature.

This embodiment of the method in accordance with the invention enables a subsequent layer to be provided on the antistatic layer without previously curing the antistatic layer. The alkoxy silane compound can be converted into silicon dioxide at relatively low temperatures (up to 200° C.). By virtue thereof the method can be simplified.

The conversion into silicon dioxide takes place, for example, by means of a treatment of at least 30 minutes at a temperature in the range between 150° C. and 170° C. The alkoxy groups of the alkoxy silane compound are converted into hydroxy groups by acidified water, with the hydroxy groups reacting with each other and with hydroxy groups of the glass surface of the display screen. During drying and heating a firmly adhering network of silicon dioxide is formed by polycondensation. A similar conversion takes place for alkoxy titane compounds.

The use of aqueous suspensions for the antimony-doped tin oxide particles has the advantage that they are less harmful to the environment. Consequently, fewer measures or perhaps no measures at all have to taken to preclude environmental pollution, so that the method can be simplified. A further advantage is that the square resistance of the layer obtained is low, i.e. approximately 1–10 MΩ. This resistance value is much lower than the values obtained with conductive layers on the basis of ATO which are made in a different manner. A further advantage of aqueous suspensions is that the adhesion of the ATO particles to the display screen suffices to dispense with a temperature treatment after the layer has dried, so that the second layer can be directly provided, for example from an aqueous or alcoholic solution of an alkoxy silane or titane compound. As soon as the coating of ATO particles has dried, the layer of the alkoxy silane solution can be provided.

The aqueous suspension is preferably provided by means of spinning. The layer thickness of the first layer, which thickness determines, inter alia, the optical and electrical properties of the coating, can then be accurately controlled. The first layer may comprise further particles, e.g. to influence the optical properties of the first layer e.g. the transmissivity and/or the refractive index.

The second layer is preferably provided by spinning.

By spinning of the alkoxy silane or titane solution a homogeneous, smooth layer is formed. Optionally, a surface-active substance is added to the solution, for example in quantities of from 0.001 to 5 wt. %.

The terms "spinning" or "spin coating" generally refer to a method in which a layer is provided on a rotating member, in this case a display screen.

Preferably, both the first and the second layer are provided by spinning without interrupting the rotation of the display screen.

This has the advantage that the production of a two-layer coating can be carried out in one and the same spinning unit. The second layer can be provided without a change of position. The display screen continues to rotate, thereby precluding dust from settling on the display screen since the air flow produced above the display screen during spinning is maintained. This enables both a simplification of the method as well as an improvement of the quality of the coating.

The method in accordance with the invention can be used for applying a coating on a display screen of a display device. Within the framework of the invention it has been recognized that the preferred method can be used and, preferably, is used for applying coatings to a display screen which forms part of a cathode ray tube.

In the method disclosed in the above-mentioned article from Japan Display, a coating is applied to a display screen which constitutes a separate part, i.e. first a display screen is provided with a coating and it is not until the display screen has been provided with a coating that the cathode ray tube is assembled. This holds the risk that the coating is damaged during assembly of the cathode ray tube. This risk is avoided by providing the coating on a display screen which forms part of a cathode ray tube. The known method is not suited for this purpose.

The antistatic layer produced by means of the method in accordance with the invention comprises conductive, for example ATO (Antimony-doped Tin Oxide) particles, which ATO particles provide the antistatic properties of the layer.

Preferably, the conductive (ATO) particles used are very small, i.e. their dimensions are preferably below 50 nm. By virtue of these small dimensions no visible scattering of light occurs and the first layer formed is transparent. The particles are sufficiently electroconductive if the molar ratio Sb/Sn is smaller than 0.3.

The particle size is preferably below 30 nm. By virtue of the small dimensions of the ATO particles, Van der Waals' forces occur which cause the adhesion of the ATO particles to a glass substrate to be sufficient to provide the second layer without disturbing the first layer. The ATO particles are provided on the display screen from an aqueous, stable ATO suspension (hydrosol). In the suspension, the ATO particles are charge-stabilized instead of sterically stabilized. Such a suspension can suitably be used for the manufacture of very thin layers having a surface resistance of approximately 1–20 MΩ/square. The preparation of such an ATO suspension is described in U.S. Pat. No. 4,775,412. By virtue of the small particle size, the mechanical strength and adherence of the layer suffices to directly provide a second layer without an intermediate curing step.

The first layer is preferably supplemented with layers of silicon dioxide having an antireflective or antiglare effect, with the additional layers also increasing the scratch resistance. The second layer serves, inter alia, as an adhesive for the first layer with ATO particles. The alkoxy silane compound (for example TEOS) penetrates into the first layer and adheres to the underlying surface. Preferably, the second layer and the first layer together form a 2-layer antireflective layer. Antireflective layers are used on display screens to reduce reflection losses of traversing light and to suppress disturbing reflections in images (specular reflection). Antiglare layers are used to reduce the specular reflection of ambient light.

An alkoxy silane compound which can suitably be used in the method in accordance with the invention is tetraethyl orthosilicate (TEOS). It is alternatively possible to use other known alkoxy silane compounds of the type $Si(OR)_4$ and oligomers thereof, wherein R is an alkyl group, preferably a $C_1$–$C_5$ alkyl group. For the solvent use is made of, for example, methanol or ethanol.

The invention also relates to a display device comprising a display screen having an antistatic, antireflective coating.

A display device comprising a display window having an antistatic coating which consists of more than one layer and which comprises at least one antistatic layer is characterized according to the invention in that the antistatic layer is directly adjacent to the display window and comprises conductive particles having a diameter below 50 nm which are embedded in silicon dioxide or titanium dioxide, which antistatic layer is covered by a second smooth layer which contains silicon dioxide or titanium dioxide, the assembly of the first and the second layer having an antireflective effect for visible light.

The refractive index of the antistatic layer comprising conductive (ATO) particles generally differs from, and is higher than, the refractive index of the additional silicon dioxide layer (for $TiO_2$ the refractive index of the conductive layer could be lower than the $TiO_2$ layer). The respective layer thicknesses of a two-layer coating are preferably selected such that destructive interference occurs at a central wavelength λ in the visible range, for example approximately 550 nm. For this wavelength, and for wavelengths in a range around said wavelength, the stack of layers has an antireflective effect. It is known to those skilled in the art that the optical thicknesses n.t (wherein n is the refractive index and t is the layer thickness) of the layers must be equal to λ/4, wherein λ is the central wavelength. Such an additional layer of silicon or titanium dioxide can be manufactured by providing an alcoholic solution of an alkoxy silane or titane compound, followed by a treatment at an increased temperature, thereby forming a layer of silicon or titanium dioxide. If the additional layer is provided by spinning, the layer thickness obtained depends, inter alia, on the number of revolutions and the viscosity of the solution. Preferably, the particle size is smaller than 50 nm. The first layer may comprise other particles influencing e.g. the optical properties of the first layer, e.g. transmissivity and/or refractive index. The anti-reflective effect could be obtained in cooperation with a third or fourth etc layer.

Preferably, a third layer of silicon dioxide having an antiglare effect is provided. This layer is provided on the first additional layer by spraying or atomizing an alcoholic solution of an alkoxy silane compound, followed by a treatment at an increased temperature, thereby forming a layer of silicon dioxide. The layer obtained is scratch resistant and has antiglare properties due to the surface texture obtained by spraying. The antiglare effect is substantially independent of the wavelength of the light. A mat surface texture is obtained by spraying or atomizing the alkoxy silane solution, so that the layer exhibits an antiglare effect. By virtue thereof, ambient light is diffusely reflected.

Further advantages of the additional layers of silicon dioxide are the reduced sensitivity to fingerprints and the higher hardness and scratch resistance.

If desired, one of the additional layers may be provided with a pigment or dye to selectively influence the light transmission. Such pigments or dyes are selected in such a manner that the light emitted by the phosphors of a cathode ray tube is selectively transmitted, whereas, for example, the ambient light reflecting at the rear side of the display screen is absorbed. Examples of pigments are transition metal oxides, such as iron oxide and chromium oxide. An example of a suitable dye is Rhodamine B.

In an embodiment of the invention, latex particles of polypyrrole are added to the aqueous solution of (ATO) particles. The polypyrrole particles provide the light-absorbing properties of the first layer. After drying, the first layer then comprises polypyrrole-latex particles.

For the polypyrrole compound use can be made of polypyrrole, N-substituted polypyrrole and β-substituted polypyrrole. For the substituents use can be made of: alkyl groups having, for example, up to 5 carbon atoms, aryl groups, alkoxy groups, nitro groups and halogen atoms. Such materials and the preparation of latex particles, inter alia, for use as an antistatic coating, are described in U.S. Pat. No. 4,959,162. Also this American Patent describes a centrifuging step and a re-dispersion step to purify the latex thus prepared. Preferably, the latex particles consist of unsubstituted polypyrrole.

Owing to the optical properties, uniformity and homogeneity of the layer, it is desirable for the latex particles to have uniform dimensions. The latex particles are spherical and preferably have an average diameter in the range between 50 and 150 nm, preferably around 60 nm. In such an embodiment, antistatic and light-absorbing properties are combined in a single layer. As a result of the method in accordance with the above embodiment of the invention, the coating comprises a homogeneous mixture of both types of particles. The layer thickness of the coating lies in the range between 50 and 200 nm. The colour of the coating is neutral grey, i.e. the transmission is independent of the wavelength. Dependent upon the layer thickness and the concentration of polypyrrole in the layer, the transmission can be adjusted, for example, between 90% and 30%, while preserving the required antistatic effect. A sufficient antistatic effect of the coating is attained if the surface resistance of the layer ranges below $10^{10}$ Ω/square, preferably between $10^4$ and $10^{10}$ Ω/square.

As described above, the combination of the coating and the additional layer of silicon dioxide exhibit an antireflective effect if the optical layer thicknesses of these layers are equal to approximately $\lambda/4$. The desired layer thicknesses can easily be experimentally determined. Important process parameters are the number of revolutions during spinning, the temperature and the viscosity of the solution.

BRIEF DESCRIPTION OF THE DRAWINGS FIGURES

Figure 2:
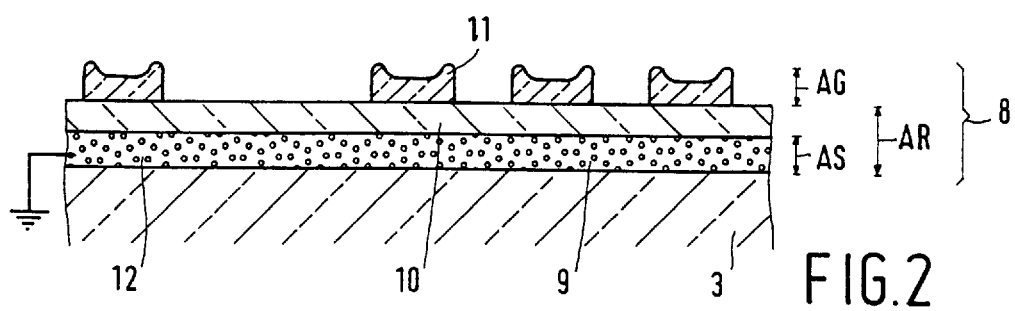
Figure 3A:
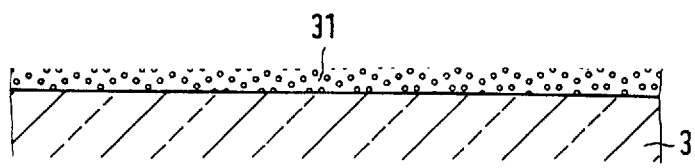
Figure 3B:
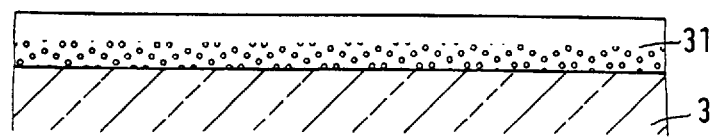
Figure 3C:
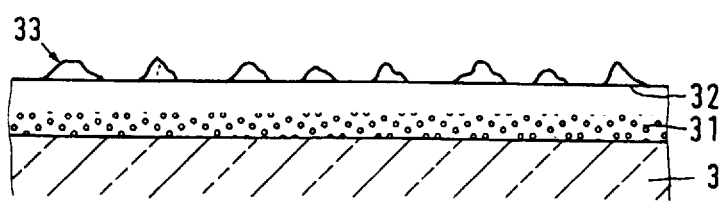
Figure 4:
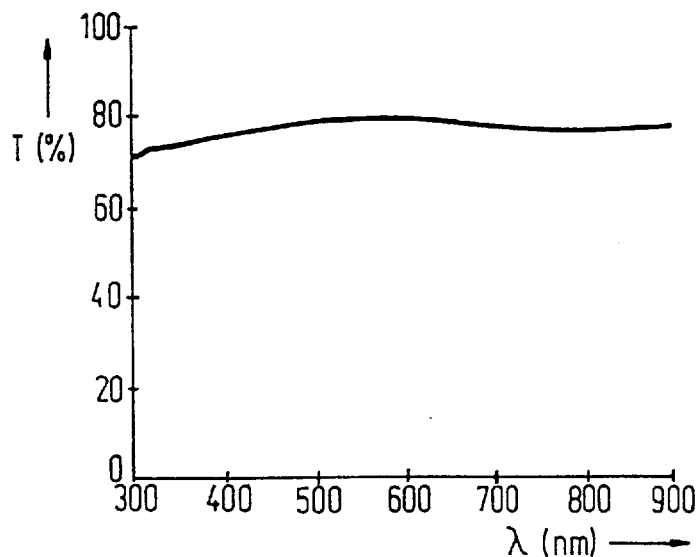
Figure 5A:
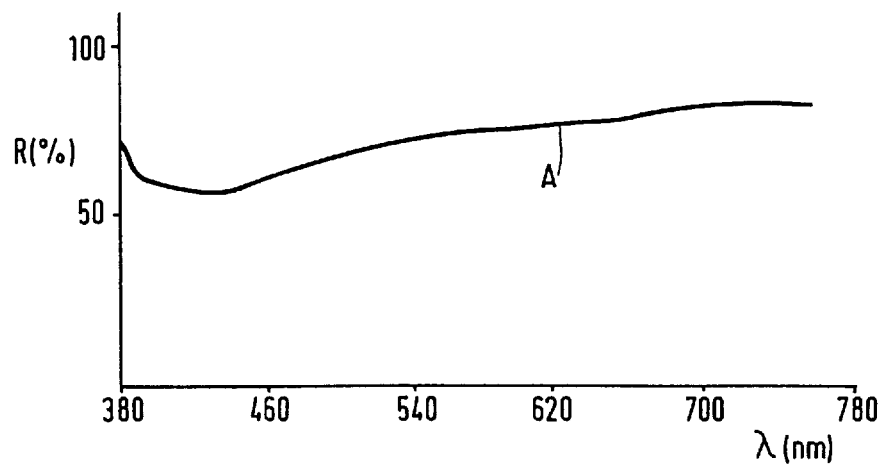
Figure 5B:
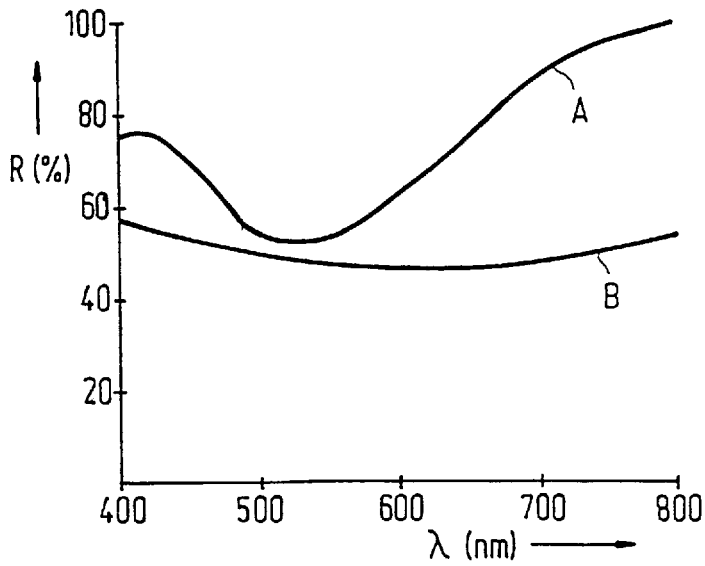

The invention will be explained in greater detail by means of exemplary embodiments and with reference to a drawing, in which FIG. 1 shows a display device, FIG. 2 is a sectional, diagrammatic view of a display window of a display device, FIGS. 3a, 3b and 3c show an embodiment of the method in accordance with the invention, FIG. 4 shows the transmission T (in %) as a function of the wavelength λ (in nm) of a coating in accordance with the invention, FIGS. 5a and 5b show the relative reflection R (in %) as a function of the wavelength λ (in nm) of a coating consisting of ATO (and polypyrrole) particles carrying an additional layer of silicon dioxide and a second additional antiglare layer of silicon dioxide.

DESCRIPTION OF THE INVENTION

FIG. 1 is a diagrammatic cut-away view of a cathode ray tube 1 having a glass envelope 2 comprising a display screen 3, a cone 4 and a neck 5. In the neck there is provided an electron gun 6 for generating an electron beam. This electron beam is focused on a phosphor layer on the inside 7 of the display screen 3. In operation, the electron beam is deflected across the display screen 3 in two mutually perpendicular directions by means of a deflection coil system (not shown). The display screen 3 is provided on the outside with an antistatic coating 8 in accordance with the invention.

FIG. 2 is a diagrammatic, sectional view of a display screen in accordance with the invention. An antistatic coating 8 is provided on the display screen 3. This antistatic coating 8 comprises a first layer 9 (AS), a second layer 10 and a third layer 11. The first layer 9 comprises conductive particles 12, in this case antimony-doped tin oxide particles, embedded in a second compound, in this example silicon dioxide. The second layer is made of the second-mentioned compound, in this example silicon dioxide. The first layer and the second layer together form an antireflection filter (AR). To this end, the thickness of both layers 9 and 10 is approximately $\lambda/4$, wherein λ is situated in the visible range, for example between 500 and 600 nm. The first layer may be provided with polypyrrole latex particles, enabling the transmission properties of the first layer to be determined. The third layer 11 (AG) provides an antiglare effect and consists, for example, of sprayed-on silicon dioxide.

FIGS. 3a up to 3c illustrate a method in accordance with the invention.

A porous layer 31 is provided on the display screen 3. This is preferably carried out, for example, by providing an aqueous solution of conductive (ATO) particles on the display screen and drying said particles. A second layer 32 of a compound is applied to the layer 31 and the compound penetrates into the first layer. After provision of the second layer, a thermal treatment is carried out. This treatment results in the formation of a silicon dioxide layer. Subsequently, a third layer is applied to obtain an antiglare effect, for example, by spraying of a silicon-dioxide antiglare layer.

Below a description will be given of a number of embodiments of the invention.

Exemplary Embodiment 1

An aqueous ATO suspension is prepared as described, for example, in U.S. Pat. No. 4,775,412. According to this document, $SnCl_2$ and $SbCl_3$ are dissolved in diluted hydrochloric acid, whereafter ammonium bicarbonate is added to the solution. In an autoclave a hydrosol of antimony-doped tin oxide is formed by hydrothermal conversion. The ATO particles are smaller than 30 nm. In a typical example, the molar ratio Sb/Sn is 0.3. The aqueous ATO suspension amounts to 5 wt. %. This ATO suspension is provided on the display screen and dried.

A solution of an alkoxy silane compound has been or is manufactured in accordance with Table 1.

TABLE 1

| preparation of TEOS-solution (250 ml) Composition and preparation: | |
|---|---|
| *mix (grams): | |
| TEOS | 11.25 |
| ethanol | 5.63 |
| 0.175 M HCL | 5.63 |

*hydrolysing for 30 min
*adding ethanol/butanol (1:1) to obtain 250 ml

On the first layer, which is obtained as described hereinabove (a dried layer comprising conductive particles (for example ATO)), a layer of the TEOS solution prepared in accordance with Table 1 is provided, for example, by spinning. The layer is maintained at a temperature of 160°

C. for approximately 90 minutes, thereby forming a firmly adhering, smooth layer of silicon dioxide. This additional layer of silicon dioxide has a layer thickness of, for example, 135 nm and a refractive index of 1.44. This layer, in combination with the antistatic layer which comprises ATO particles and into which silicon dioxide has penetrated and which has a refractive index of 1.62 and a layer thickness of 60 nm, exhibits an antireflective effect. It is noted that the sequence in which the layers are applied is important. If the silicon dioxide layer were to be provided before the layer containing the ATO particles, this would adversely affect the adhesion of the coating and the refractive index of the layer comprising ATO particles would be different, namely approximately 1.4, and the layer would contain no or perhaps hardly any silicon oxide. Furthermore, an antireflective effect would be virtually non-existant (the indices of refraction of both layers would hardly differ).

Consequently, the optical and mechanical properties of the assembly of the first and the second layer depend on the sequence in which the layers are provided. Preferably, the antistatic layer and the second layer are provided by spinning. Preferably, this is carried out in one and the same spinning unit without interrupting the spinning process of the display screen. This results in a simplification of the method and precludes dust from settling on the display screen.

Subsequently, if desired, use is made of a TEOS solution and a similar temperature treatment to provide a second additional layer of silicon dioxide by spinning. This layer has a mat surface texture having an antiglare effect. Consequently, the coating obtained is less sensitive to fingerprints. In addition, the reflection is less dependent on the wavelength because the incident light is diffusely scattered. The above method can be used to provide a coating (two-layer or multilayer) on a loose display screen, i.e. a display screen which does not (yet) form part of a cathode ray tube. Preferably, however, the method is used to provide a coating on a display screen which forms part of a cathode ray tube. The risk that the coating becomes damaged is smaller then.

Exemplary Embodiment 2

In this exemplary embodiment a description is given of a method and a display device in which the first layer also influences the transmission of visible light by the incorporation of polypyrrole latex particles in the first layer.

Polypyrrole latex particles are prepared by vigorously stirring a mixture of 0.938 g pyrrole, 8.65 g $FeCl_3.6H_2O$ and 1 g polyvinyl alcohol (steric stabilizer) in 100 ml water for at least 10 hours until a clear solution is obtained. The formation of polypyrrole particles can be recognized by the blackening of the mixture. The suspension obtained is dialysed with demineralised water to remove $Fe^{2+}$ions and $Cl^-$ions. After dialysis, several millilitres of ethanol, butanol and ethyl acetate are added to the suspension. Finally, the suspension is passed through a 5 $\mu$m and a 0.2 m filter of polyamide. Electron microscopy shows that the latex particles have a regular, spherical shape and that they are monodisperse with an average particle size of 80 nm.

The preparation of an ATO suspension is carried out in the way described in example 1.

Equal quantities of both suspensions are subsequently mixed, thereby forming a stable suspension of ATO and polypyrrole particles. This suspension is subsequently provided on a display screen by means of spin coating. After drying, a homogeneous, neutral grey coating having a thickness of 60 nm and a resistance of 1 M$\Omega$/square is obtained.

This is amply sufficient for the desired antistatic effect (a surface resistance in the range between $10^4$ and $10^{10}$ $\Omega$ is desirable) and makes it possible to bring the light transmission properties to the desired value by changing the layer thickness and the concentration of the polypyrrole, while preserving the necessary antistatic effect. The transmission T (in %) as a function of the wavelength $\lambda$ (in rim) of the coating obtained is shown in FIG. 4. The resistance value of the coating in accordance with the invention is much lower than the values of layers of silicon dioxide in which ATO particles or polypyrrole particles with a steric stabilizer are dispersed. Such layers have a resistance of approximately 100 M$\Omega$. A solution of an alkoxy silane compound is prepared having the following composition: 0.9 mol tetraethyl orthosilicate (TEOS), 3.6 mol water, $5.10^{-4}$ mol nitric acid, which is made up to 1 litre by adding ethanol.

The first layer obtained in accordance with exemplary embodiment 2 is provided with a layer of TEOS solution by spinning. The layer is maintained at a temperature of 160° C. for 30 minutes, thereby forming a firmly adhering, smooth layer of silicon dioxide. This additional layer of silicon dioxide has a layer thickness of 135 nm and a refractive index of 1.44. This layer, in combination with the coating which comprises ATO and polypyrrole particles and which has a refractive index of 1.62 and a layer thickness of 60 nm, has an antireflective effect. It is possible to fine-tune the anti-reflective effect by slightly altering the layer thicknesses, for instance making the thickness of the first layer approximately 100 nm and the thickness of the second layer approximately 80 nm.

Subsequently, the same TEOS solution is used and a similar temperature treatment is carried out to provide a second additional layer of silicon dioxide by spraying. This layer has a mat surface texture having an antiglare effect. As a result, the coating obtained is less sensitive to fingerprints. In addition, the reflection is less dependent on the wavelength because the incident light is diffusely scattered.

FIG. 5a represents the relative reflection R (in %) as a function of the wavelength $\lambda$ (in nm) of a coating consisting of the above-described layer of ATO particles (example 1) on which the additional layer of silicon dioxide and an antiglare layer (curve A) are provided. In the measuring process, uncoated display-screen glass is used as the reference material.

FIG. 5b represents the relative reflection R (in %) as a function of the wavelength $\lambda$ (in nm) of a coating consisting of the above-described layer of ATO and polypyrrole particles (example 2) on which the additional layer of silicon dioxide (curve A) is provided. In the measuring process, uncoated displayscreen glass is used as the reference material. Curve B shows the effect of the additional antiglare layer. The antireflective effect of the coating has become less dependent on the wavelength.

The scratch resistance of the outermost layer is tested by means of a conical diamond which is moved over the surface at a force of 50 g and which does not form scratches which are visible to the naked eye.

The hardness is tested by means of a pencil-hardness test in which pencils having a different hardness exert a force of 7.5N on the surface over which they are moved at an angle of 45° and a velocity of 0.05 m/s. In accordance with this test, the inventive layer has a degree of hardness of from 3 H to 4 H.

By means of the above embodiments of the invention, effective antistatic coatings and, if desired, light-absorbing coatings are manufactured and provided on a display screen of a cathode ray tube in a simple manner, with the coatings enabling the light-transmission properties to be adjusted, whether or not as a function of the wavelength.

It will be clear that within the framework of the invention many other embodiments are possible. For instance an exemplary embodiment 3 in which an ATO-layer is covered with a $TiO_2$ layer is described below.

Exemplary Embodiment 3

An ATO suspension as described in exemplary embodiment 1 above is applied to a display screen and dried (dried means within the concept of the invention also left to dry). A solution of an alkoxy titane compound has been or is manufactured in accordance with Table 2.

TABLE 2 preparation of TEOTi-solution (250 ml)
Composition and preparation:

*mix (grams, ml)

| | |
|---|---|
| TEOTi | 5,775 gr |
| ethanol | 123 ml |
| butanol | 120 ml |
| water (0.5 M HCl) | 1,83 gr |

*stir for several hours

On the first layer of ATO particles a second layer of the TEOTi solution according to table 2 is applied, for instance by spinning. The double layer is subsequently held for approximately 90 minutes at a temperature of 160° C. The resulting coating comprises a second layer of $TiO_2$ having an refractive index of approximately 2.0 on top of a layer comprising ATO-particles in a $TiO_2$ matrix due to the fact that the titane compound is penetrated in the layer with ATO particles. The bottom layer has a refractive index of approximately 1.8 to 1.9. The bottom layer can have for instance a thickness of 60 nm whereas the second layer has a thickness of for instance 200 nm. On top of the $TiO_2$ layer a $SiO_2$ layer can be provided for instance by spinning a layer of a silane compound on the $TiO_2$ layer.

It is also possible that the first layer may comprise further particles, e.g. to influence the optical properties of said first layer e.g. the transmissivity and/or the refractive index. An example has been given above in which the first layer comprises latex particles which influence the transmissivity of the first layer and therewith of the coating. It is also possible that the first layer comprises, besides the conductive particles, particles influencing other properties of the first layer, such as for instance the refractive index. A fourth exemplary embodiment is given below in which said first layer comprises particles influencing the refractive index of the first layer. By influencing the refractive index a fine-tuning of the optical properties and more in particular of the reflective properties of the coating can be achieved.

Exemplary Embodiment 4

By mixing the conductive particles with e.g. anorganic colloidal oxides, such as $SiO_2$ or $Al_3O_2$ it is possible to influence the refractive index of the first layer. Preferably the oxide particles are smaller than 100 nm.

For example, to 100 grams of an ATO-solution (12% by weight), 7 grams of a colloidal $SiO_2$ solution (40 weight % of $SiO_2$) is added. This solution is diluted 1:4 with an alcoholic solution and applied to a screen by means of spinning. When the layer has dried up, a TEOTi solution (see e.g. exemplary embodiment 3) is by means of spinning applied to the screen. When the second layer has dried up, a third layer of a TEOS solution (see e.g. exemplary embodiment) is by means of spinning applied to the screen. Thereafter the three-layer coating is subjected to a treatment at a raised temperature to harden the coating. An exemplary coating in which the first layer (comprising ATO-particles and $SiO_2$ particles) has a thickness of 70 nm and a refractive index of 1.75, the second layer ($TiO_2$) has a thickness of 102 nm and a refractive index of 1.95 and the third layer $SiO_2$ has a thickness of 90 nm and a refractive index of 1.44 has excellent anti-reflective properties. In the visible range the reflectivity is strongly reduced and between approximately 400 and 600 nm, the reflectivity is reduced to less than 10% of the reflectivity without a coating.

We claim:

1. A method of providing an antistatic coating consisting of more than one layer on a display screen, said coating comprising at least one antistatic layer, said method comprising:

providing a first, antistatic layer comprising conductive particles on said display screen, said conductive particles being particles of antimony-doped tin oxide;

providing, on said first layer, a second layer of a material capable of penetrating said first layer, said second layer comprising a layer of an aqueous or an alcoholic solution of an alkoxy silane or an alkoxy titane, and, after said material has penetrated said first layer;

heating said second layer at a temperature capable of converting said alkoxy silane or said alkoxy titane to silicon dioxide or titanium dioxide respectively.

2. The method as claimed in claim 1, wherein the layer comprising conductive particles is a porous layer.

3. The method as claimed in claim 1, wherein the antistatic layer is provided as an aqueous dispersion of particles of antimony-doped tin oxide and which layer is dried prior to providing the second layer.

4. The method as claimed in claim 1, wherein the first and the second layer are provided by spinning without interrupting the rotation of the display screen.

5. The method as claimed in claim 3, wherein latex particles of polypyrrole are added to the aqueous dispersion of antimony-doped tin oxide particles.

6. The method as claimed in claim 4, wherein latex particles of polypyrrole are added to the aqueous dispersion of antimony-doped tin oxide particles.

7. The method as claimed in claim 1, wherein the antistatic coating is provided on a display screen which forms part of a cathode ray tube.

8. The method as claimed in claim 1, wherein the conductive particles are smaller than 50 nm.

9. The method as claimed in claim 8, wherein latex particles of polypyrrole are added to the aqueous dispersion of antimony-doped tin oxide particles.

10. The method as claimed in claim 1, wherein a third layer of an alcoholic solution of an alkoxy silane material is sprayed onto the second layer, whereafter the alkoxy silane material is converted into a further additional layer of silicon dioxide by subjecting it to a treatment at an increased temperature, said further additional layer producing an antiglare effect.

11. A method of providing an antistatic coating comprising more than one layer on a display screen, said coating comprising at least one antistatic layer, said method comprising:

providing a first, antistatic layer comprising conductive particles on said display screen;

providing, on said first layer, a second layer of a material, said material capable of penetrating said first layer, said second layer comprising a layer of an aqueous or an alcoholic solution of an alkoxy silane or an alkoxy titane; and heating said second layer at a temperature capable of forming a firmly adhering network on said display screen.

12. The method as claimed in claim 11, wherein the conductive particles of said antistatic layer comprises particles of antimony-doped tin oxide.

13. The method as claimed in claim 11, wherein the antistatic layer is provided as an aqueous dispersion of particles of antimony-doped tin oxide and wherein said antistatic layer is dried prior to providing the second layer.

14. A method of providing an antistatic coating comprising more than one layer on a display screen, said coating comprising at least one antistatic layer, said method comprising:

providing a first, antistatic layer comprising conductive particles on said display screen;

providing, on said first layer, a second layer of a material capable of penetrating said first layer, said second layer comprising a layer of an aqueous or an alcoholic solution of an alkoxy silane or an alkoxy titane, and, after said material has penetrated said first layer;

heating said second layer at a temperature capable of converting said alkoxy silane or said alkoxy titane to silicon dioxide or titanium dioxide respectively.

15. The method as claimed in claim 14, wherein the conductive particles of the antistatic layer comprises particles of antimony-doped tin oxide.

16. The method as claimed in claim 15, wherein the antistatic layer is provided as an aqueous dispersion of particles of antimony-doped tin oxide and which layer is dried prior to providing the second layer.

* * * * *